United States Patent [19]
Cahill, III

[11] Patent Number: 6,067,122
[45] Date of Patent: May 23, 2000

[54] HOST-BASED ANTI-GHOSTING OF TELETEXT DATA BASED ON NON-OVERSAMPLED DATA

[75] Inventor: Benjamin M. Cahill, III, Ringoes, N.J.

[73] Assignee: Intel Corporation, Santa Clara, Calif.

[21] Appl. No.: 09/066,741

[22] Filed: Apr. 23, 1998

[51] Int. Cl.[7] .................. H04N 5/21; H04N 7/00
[52] U.S. Cl. .......... 348/478; 348/468; 348/466; 348/461; 348/614
[58] Field of Search .................. 348/478, 476, 348/473, 468, 466, 461, 614, 465

[56] References Cited

U.S. PATENT DOCUMENTS

| | | | |
|---|---|---|---|
| 4,388,645 | 6/1983 | Cox et al. | 358/86 |
| 4,449,145 | 5/1984 | Ciciora | 348/468 |
| 4,679,082 | 7/1987 | Shibasaki | 348/468 |
| 4,896,213 | 1/1990 | Kobo et al. | 348/478 |
| 5,047,859 | 9/1991 | Koo | 358/187 |
| 5,111,298 | 5/1992 | Koo | 348/614 |
| 5,321,512 | 6/1994 | Huang | 348/614 |
| 5,361,102 | 11/1994 | Roy et al. | 348/611 |
| 5,448,299 | 9/1995 | Yang et al. | 348/475 |
| 5,488,418 | 1/1996 | Mishima et al. | 348/398 |
| 5,555,025 | 9/1996 | McArthur | 348/468 |
| 5,600,380 | 2/1997 | Patel et al. | 348/614 |
| 5,619,275 | 4/1997 | Tults | 348/468 |
| 5,627,594 | 5/1997 | Van Gestel | 348/468 |
| 5,812,207 | 9/1998 | Cahill | 348/465 |
| 5,812,217 | 9/1998 | Cahill, III | 348/614 |

*Primary Examiner*—John K. Peng
*Assistant Examiner*—Linus H. Lo
*Attorney, Agent, or Firm*—Blakely, Sokoloff, Taylor & Zafman LLP

[57] ABSTRACT

A method and apparatus are provided for performing host-based anti-ghosting of teletext data in a television signal using non-oversampled data. Teletext data is first encoded within a television signal using multi-level error correction encoding, including the use of an inner correction code and an outer correction code. The television signal is then transmitted using multiple signal level modulation encoding, while adhering to the standard teletext timing. A remote computer system receives the television signal containing the encoded teletext data. A tuner/capture subsystem of the computer system oversamples the teletext data and uses the oversampled data to reconstruct the bit peaks of the teletext data. The teletext data are then provided to a main memory of the computer system via a host interface as non-oversampled data. The host processor performs anti-ghosting, data slicing, and multi-level decoding of the teletext data based on the non-oversampled data.

24 Claims, 7 Drawing Sheets

HOST-BASED ANTI-GHOSTING OF TELETEXT DATA BASED ON NON-OVERSAMPLED DATA

FIELD OF THE INVENTION

The present invention pertains to the field of television signal processing. More particularly, the present invention relates to techniques for decoding and performing anti-ghosting of vertical blanking interval (VBI) data in a television signal.

BACKGROUND OF THE INVENTION

Conventional television sets and many other display devices generate their displays by using one or more electron guns to illuminate each line on the television screen. The television transmission signals typically include a vertical blanking interval (VBI), which is the time required to reset the electron gun to the top of the television screen from the bottom of the screen after the screen has been illuminating. Often a portion of the VBI is used by television broadcasters to transmit control information necessary for displaying audio and video information. This control information includes, for example, video synchronization signals. In addition, a portion of the VBI is typically reserved for broadcasting the text for closed captioning for the hearing impaired.

Broadcasters also may use time within the VBI to broadcast a variety of other types of data, typically referred to as teletext data, of the broadcaster's own choosing. VBI scan lines are typically broadcast in accordance with one of a number of industry standard formats. For example, teletext scan lines are often broadcast in accordance with the North American Basic Teletext Specification (NABTS). See "Joint EIA/CVCC Recommended Practice for Teletext North American Basic Teletext Specification (NABTS)", EIA-516, May 1988. NABTS calls for a modulated data bit rate of 5.7272 MHz.

Hardware for capturing teletext data commonly samples received teletext data using a technique called "oversampling" to recover the bit peaks of the teletext data. Oversampling may be defined as sampling the received analog signal at a rate that is higher than the teletext data symbol rate (e.g., the NABTS rate). For example, teletext data is typically oversampled at a rate that is from two-to-eight times the NABTS rate.

One problem associated with the broadcast of teletext data is ghosting. Ghosting is often caused by reflections of a television signal off of an object in the signal's path. Ghosting presents a problem when transferring data over the VBI, because the reflected signals interfere with the data that is being transmitted. Accordingly, televisions and computer systems equipped to receive television signals may include an anti-ghosting mechanism. Examples of anti-ghosting mechanisms are Adaptive Baseband Equalization (ABBE) filtering and Lookup Table (LUT) filtering.

A computer system equipped to receive television signals typically includes a tuner subsystem for capturing the television signals, which may be connected on an expansion bus, such as a Peripheral Component Interconnect (PCI) bus. Decoding and anti-ghosting of the teletext data are commonly performed by the tuner/capture subsystem, which transfers the decoded data in digital form to the host over the expansion bus. Implementing these functions within the tuner subsystem, however, undesirably adds to the cost and complexity of the tuner subsystem. On the other hand, performing these functions on the host by providing the host with oversampled data would consume an undesirable amount of bus bandwidth and memory. What is needed, therefore, is a technique for processing teletext data, including anti-ghosting, which overcomes these and other problems.

SUMMARY OF THE INVENTION

The present invention includes a method and apparatus for processing VBI data. A television signal containing VBI data is first received. The VBI data is extracted from the television signal and then provided to a host processor in the form of non-oversampled data. The host processor then performs anti-ghosting of the VBI data based on the non-oversampled data.

In certain embodiments of the present invention, the VBI data is encoded in the television signal using a plurality of nested encoding schemes. Accordingly, in such embodiments the method may further include decoding a received television signal based on a first error correction scheme to produce first decoded data, and decoding the first decoded data based on a second error correction scheme to obtain the VBI data.

Another aspect of the present invention is a method of processing a television signal including encoded VBI data. The television signal is first received and demodulated. Data in the television signal is then decoded based on a first error correction scheme to produce first decoded data, and the first decoded data is decoded based on a second error correction scheme to produce the VBI data.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for performing host-based anti-ghosting of teletext data using non-oversampled data are described. In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram or other symbolic form in order to facilitate description of the present invention.

As will be described further below, the present invention provides that anti-ghosting of teletext VBI data is performed by the host processor of a computer system, rather than in dedicated hardware (e.g., the tuner/capture subsystem). In addition, bit peak reconstruction is performed in the tuner/capture subsystem, such that there is no need to provide oversampled data from the capture subsystem to the host. The present invention, therefore, provides for a significant reduction in bus bandwidth consumption associated with capturing VBI data in a computer system while remaining compatible with current teletext timing standards. Host-based processing of this sort, as opposed to hardware-based processing, also provides for more robust reception of VBI data while reducing costs that would otherwise be associated with hardware-based anti-ghosting. In addition, the techniques of the present invention permit the upgrading of algorithms for anti-ghosting through software updates without the added cost of hardware-based program memory. Further, the techniques of the present invention avoid the need to perform clock recovery and bit peak reconstruction filtering (decimation/interpolation) on the host.

As will also be described further below, increased bandwidth capacity of transmitted teletext data is achieved through the use of data compression, multiple signal level modulation encoding, and the use of nested inner and outer error correction encoding. Timing compatibility with standard teletext signals is maintained to provide transparent flexibility at the VBI capture hardware level when using 1:1 sampling (non-oversampling).

In accordance with the present invention, teletext data is first encoded at a transmission site for error correction using two forms of encoding. Specifically, the teletext data is encoded with both an "inner" correction code and an "outer" correction code. The television signal is then modulated using multiple signal level encoding while adhering to standard teletext timing and is broadcast. At a remote location, a computer system receives the television signal containing the encoded teletext data. The television signal is demodulated, and the teletext data is extracted in the computer system's tuner/capture subsystem. The non-oversampled teletext data are then provided to main memory of the computer system via a host interface, which may include a PCI bus or the like. Captured video data may also be provided to main memory or to another appropriate destination, such as a display device. The host processor performs anti-ghosting on the non-oversampled teletext data, slices the teletext data, and decodes the teletext data, including decoding the dual error correction encoding mentioned above.

As will be apparent from the foregoing, certain aspects of the present invention may be embodied in software. That is, present invention may be carried out in a computer system in response to its processor executing sequences of instructions contained in memory. The instructions may be executed from memory, for example, and may be loaded from a persistent store, such as a mass storage device and/or from one or more other remote computer systems. In various embodiments of the present invention, however, hardwired circuitry may be used in place of, or in combination with, software instructions to implement these aspects of the present invention.

Figure 1:
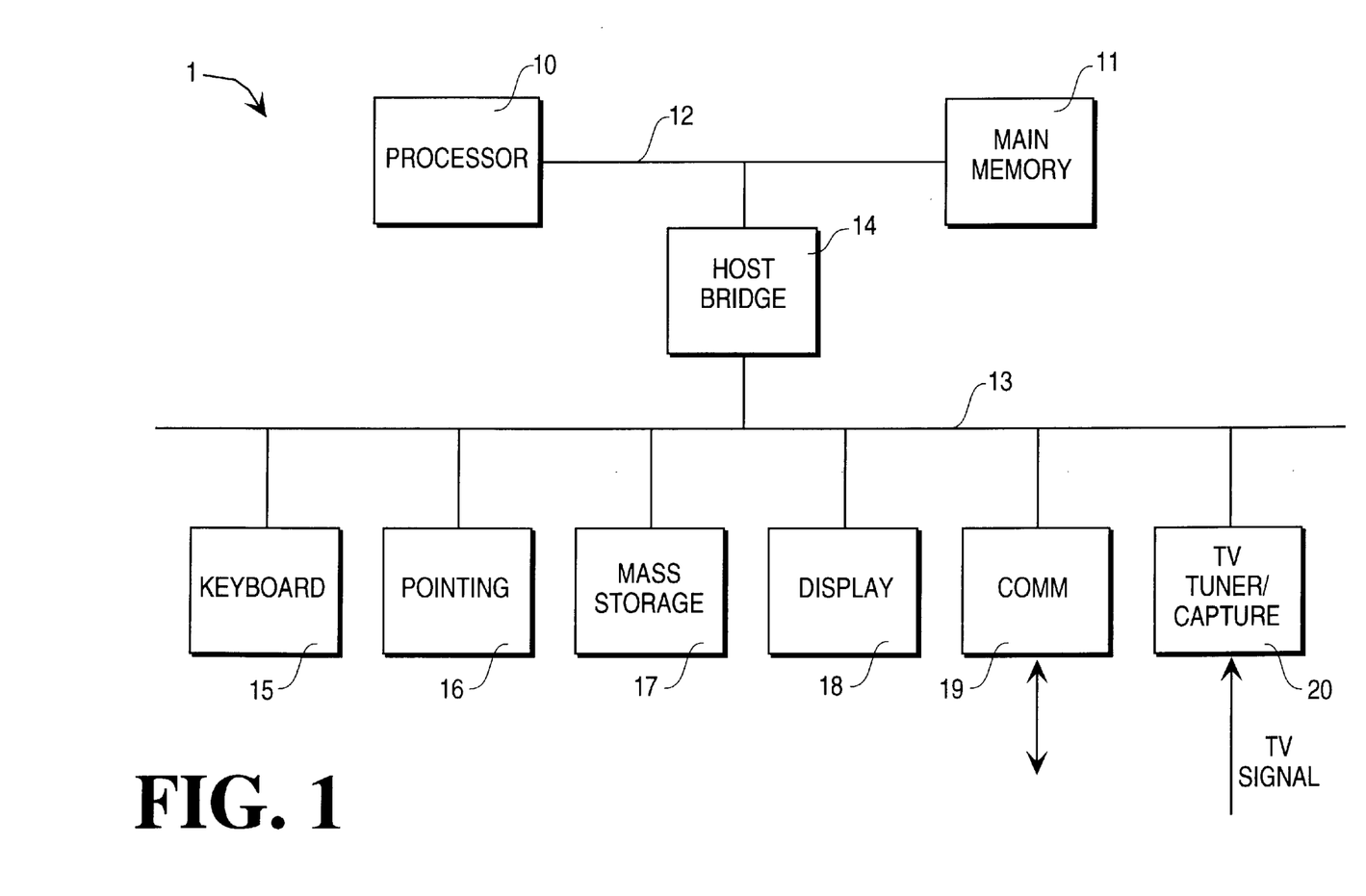
FIG. 1 illustrates a computer system in which aspects of the present invention are implemented.

Referring now to FIG. 1, a block diagram is shown of a computer system 1, which may be used in accordance with the present invention to receive a television signal including teletext data, to decode the teletext data, and to perform anti-ghosting and other processing of the teletext data. Note that numerous variations upon the architecture shown are possible without departing from the scope of the present invention. Computer system 1 includes a processor 10, which may be a conventional microprocessor and which is connected to main memory 11 by a system bus 12. Main memory 11 includes Random Access Memory (RAM) and may also include Read-Only Memory (ROM). The system bus 12 is coupled to a peripheral bus 13 via a host bridge 14. Host bridge 14 may include any of a number of well-known bridges, controllers, and/or adapters for linking buses 12 and 13, and for enabling the components of computer system 1 to communicate with each other. Peripheral bus 13 may be any of a number of well-known expansion buses, such as a PCI bus. A number of components are connected to the peripheral bus 13, including a keyboard 15, a pointing device 16, a mass storage device 17, a display device 18, a communication device 19, and a television (TV) tuner/capture subsystem 20.

Pointing device 16 may be any device suitable for enabling a user to position a pointer on display device 18, such as a mouse, trackball, or touchpad. Mass storage device 17 may include any device suitable for storing large volumes of data, such as a magnetic disk or tape, a magneto-optical (MO) storage device, or any of numerous forms of Compact Disk (CD) based storage device (e.g., CD-ROM, CD-R, CD-RW) or Digital Versatile Disk (DVD) based storage device. Communication device 19 may be any device suitable for enabling the computer system 1 to communicate data with a remote computer system, such as a modem, Ethernet adapter or the like. Display device 18 represents any device suitable for displaying text, graphics and video, such as a cathode ray tube (CRT), liquid crystal display (LCD), or the like, and associated controllers and memory.

Tuner/capture subsystem 20 inputs a television signal received from an antenna, satellite dish, or cable television jack. The television signal may conform to a well-known television format, such as National Television Standards Committee (NTSC) or Phase Alternating Line (PAL). The tuner/capture subsystem 20 captures and tunes the television signal, converts the signal to digital data, and provides the digital video data to main memory 11 (RAM) or to a display device via expansion bus 13 and host bridge 14. Tuner/capture subsystem 20 may also provide the digital video data to a display device via a direct (side port) connection. In addition, tuner/capture subsystem 20 extracts VBI based teletext data from the television signal and provides the extracted teletext data to main memory 11 via expansion bus 13 and host bridge 14.

Figure 2:
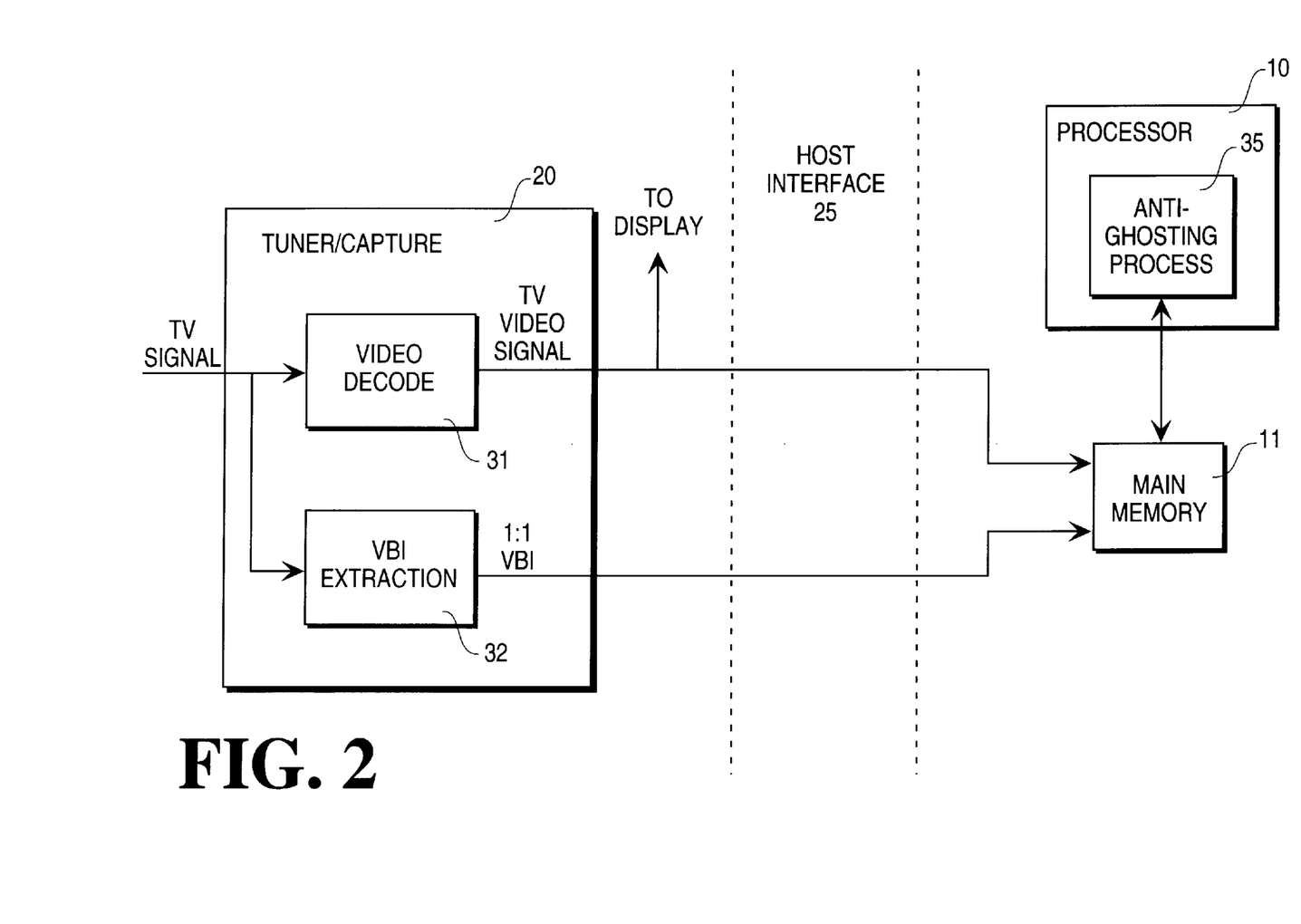
FIG. 2 illustrates a television tuner/capture subsystem coupled to a main memory via a host interface.

FIG. 2 illustrates the tuner/capture subsystem 20 in greater detail. As shown, tuner/capture subsystem 20 includes a capture unit 31 and VBI extraction unit 32, each coupled to input the received television signal. Tuner/capture subsystem 20 is coupled to main memory 11 via host interface 25. Host interface 25 collectively represents the connections between tuner/capture subsystem 20 and main memory 11, such as expansion bus 13, host bridge 14, and system bus 12.

As noted above, the present invention provides that anti-ghosting is performed by the host processor 10, which executes anti-ghosting process 35. Anti-ghosting process 35 does not require oversampled data. While oversampling generally is performed for purposes of reconstructing the bit peaks of teletext data, it is not necessary for purposes of performing anti-ghosting. The present invention takes advantage of this fact. Hence, bit peak reconstruction is performed by VBI extraction unit 32 in tuner/capture subsystem 20, while anti-ghosting is performed by processor 10. Generally, VBI extraction unit 32 extracts the VBI data from the television signal and provides the VBI data to main memory 11, where it is accessed by the processor 10 for decoding, anti-ghosting and other processing. Capture unit 31 captures and samples the input television signal and provides 1:1 sampled (non-oversampled) data representing the television signal to main memory 11 via host interface 25. In this context, "non-oversampled" means that the analog signal is sampled at a standard-specified teletext data rate, which in one embodiment is the NABTS teletext data rate of 5.7272 MHz. The samples are preferably at the centers of the bit peaks, to improve decoding accuracy. The 1:1 sampled data stored in main memory 11 is then accessed by processor 10 and used in the anti-ghosting process 35 to perform anti-ghosting of the stored VBI data.

Figure 3A:
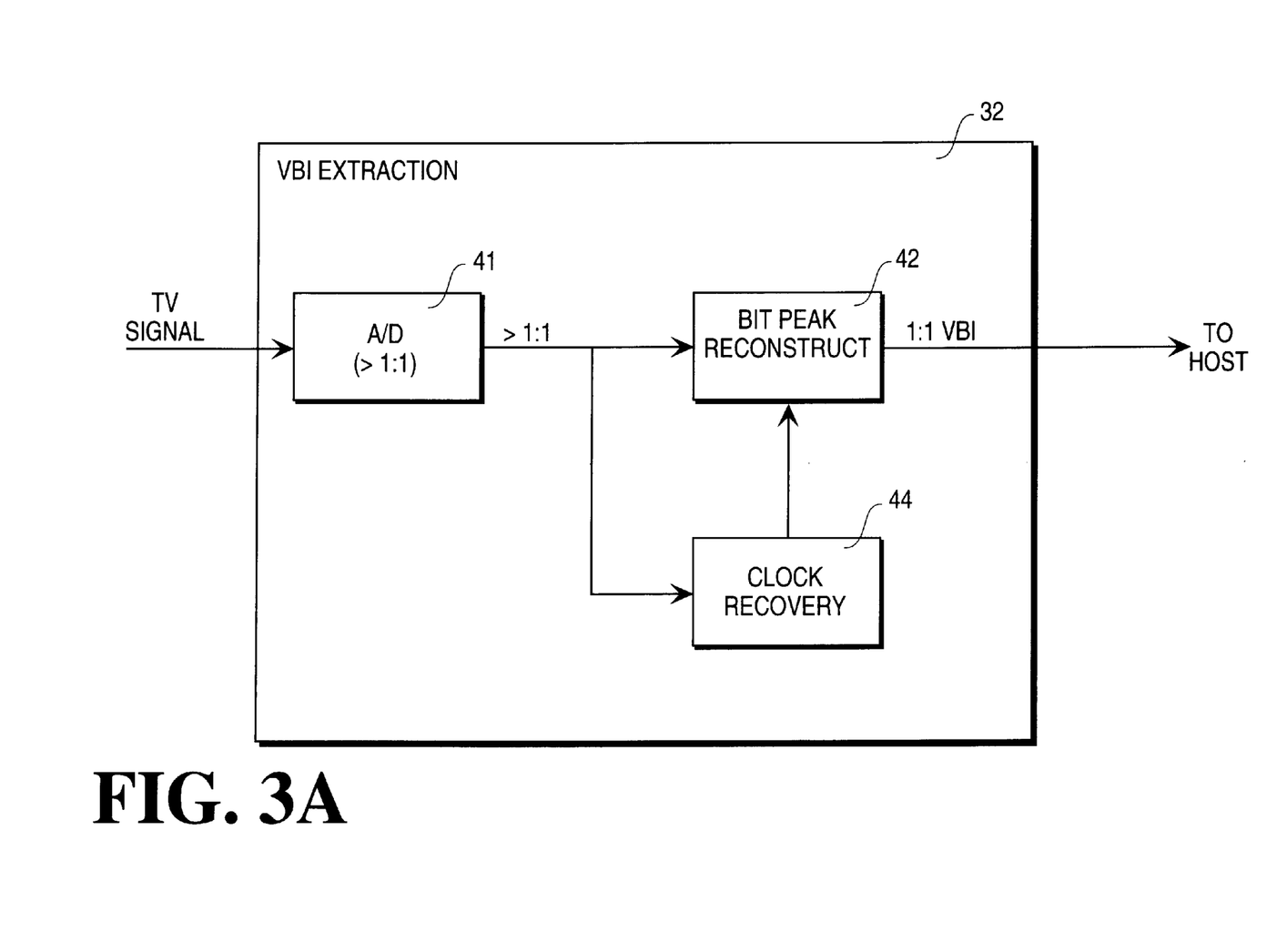
FIG. 3A illustrates the VBI extraction unit of the tuner/capture subsystem of FIG. 2, according to one embodiment.

FIG. 3A illustrates the VBI extraction unit 32 in greater detail, according to one embodiment. VBI extraction unit 32 includes an analog-to-digital (A/D) converter 41, a bit peak reconstruction unit 42, and a clock recovery unit 44. The input television signal is received by A/D converter 41 and oversampled relative to the NABTS rate. The sampling rate of A/D converter 41 may be, for example, in the range of three to five times the NABTS rate. The oversampled date are then provided to both bit peak reconstruction unit 42 and clock recovery unit 44. In one embodiment, the output of the A/D converter 41 is in the form of eight-bit samples. Clock recovery unit 44 uses the sampled data to locate the run-in clock within the teletext data and to provide run-in clock information to bit peak reconstruction unit 42. Bit peak reconstruction unit 42 uses the oversampled data to reconstruct the bit peaks of the teletext data, which are then provided to main memory 11 as (in one embodiment) eight-bit values at the NABTS rate, i.e., at the non-oversampled (1:1) rate. The extracted teletext data is ten accessed in main memory 11 by the host for further processing, including anti-ghosting, data slicing, and decoding of the teletext data.

Figure 3B:
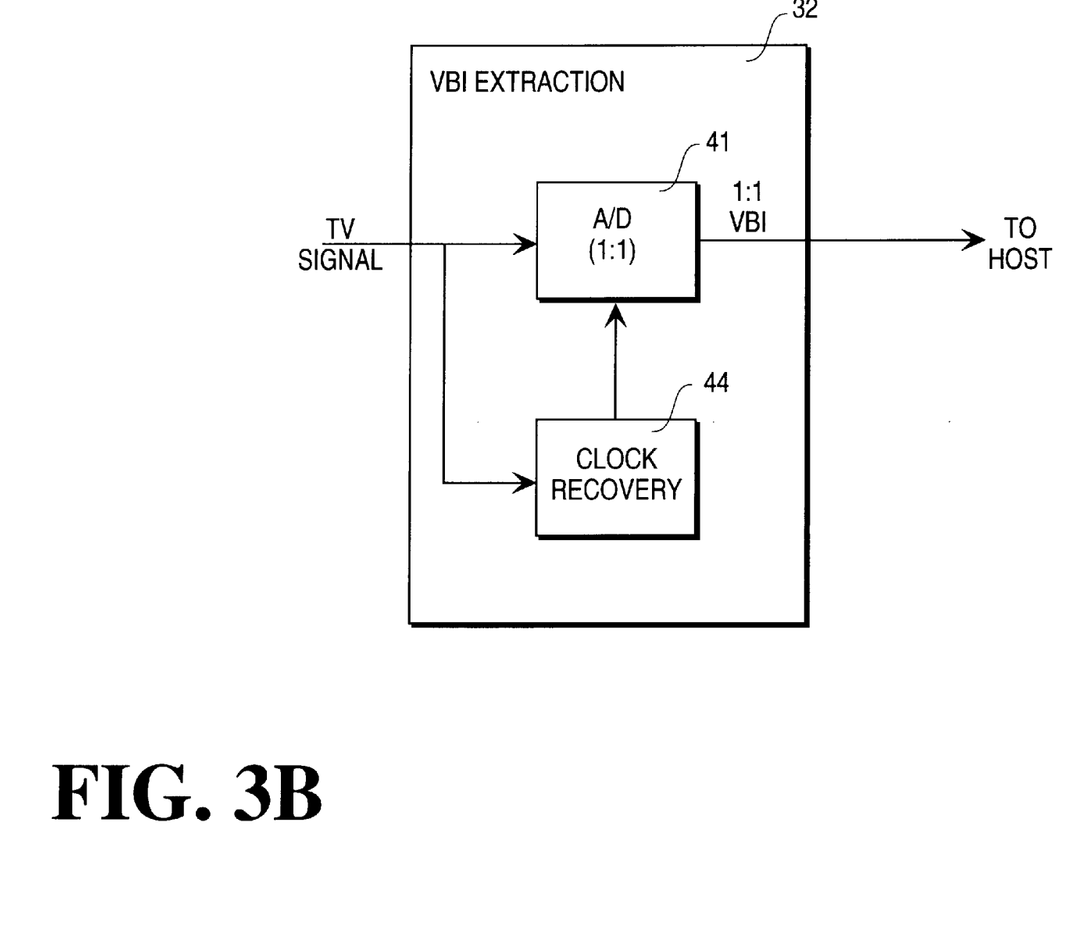
FIG. 3B illustrates the VBI extraction unit of the tuner/capture subsystem of FIG. 2, according to a second embodiment.

FIG. 3B illustrates another embodiment of the VBI extraction unit 32, in which clock recovery is performed by providing the input television signal directly to the clock recovery unit 44, the output of which clocks the A/D converter 41. In this embodiment, the A/D converter 41 samples the input television signal at the NABTS rate, in contrast with the embodiment of FIG. 3A. Hence, the output of the A/D converter, which is non-oversampled VBI data, is provided to main memory 11 via the host interface 25. A separate bit peak recovery unit is not needed or used in this embodiment.

Figure 4:
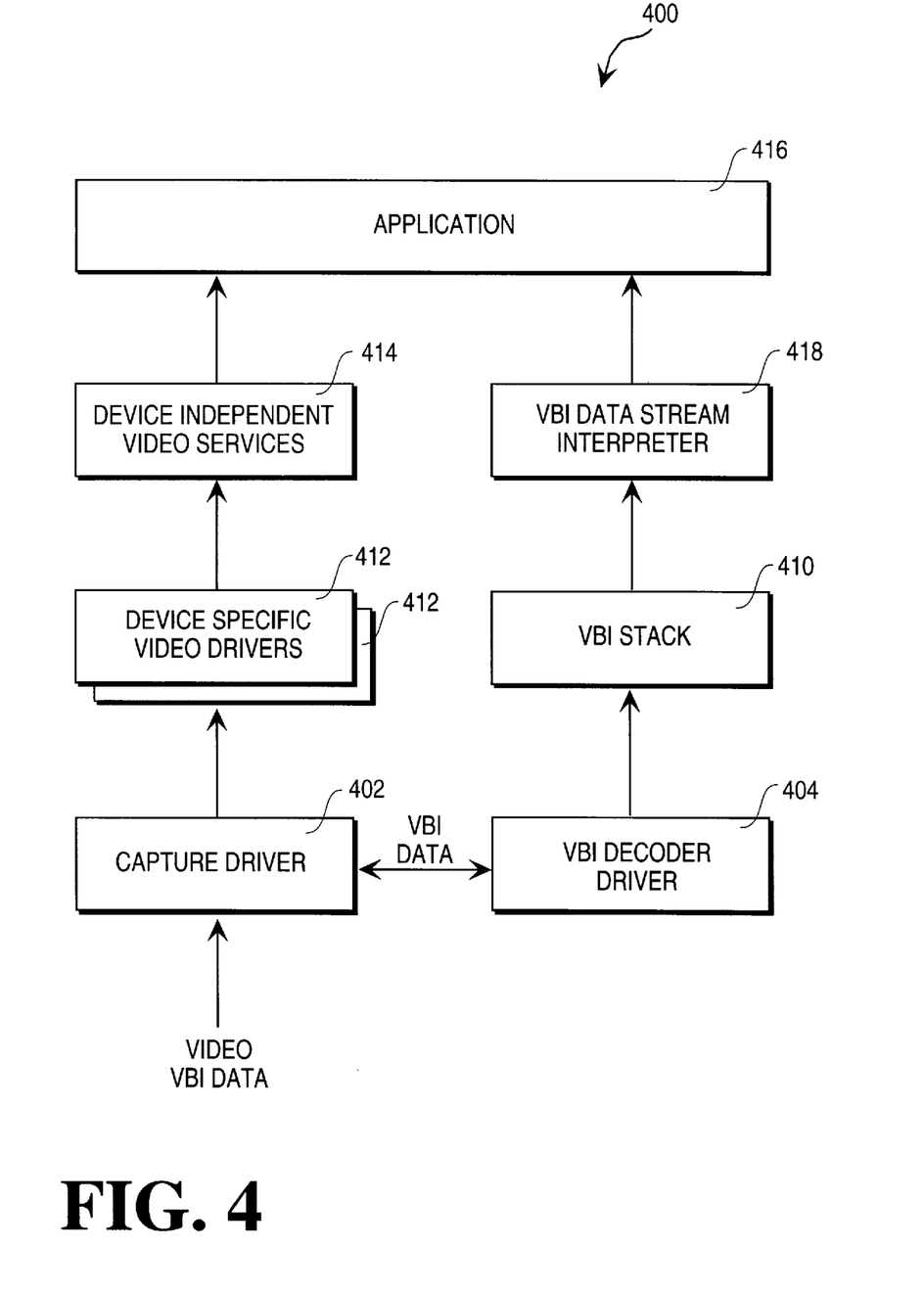
FIG. 4 illustrates a software environment for receiving and decoding a television signal including teletext data.

FIG. 4 is a block diagram of a software environment for computer system 1 suitable for practicing aspects of the present invention. As shown, software embodiment 400 includes a capture driver 402 associated with the tuner/capture subsystem 20 and a VBI decoder driver 404. Capture driver 402 and VBI decoder driver 404 cooperate to generate image scan lines and VBI (e.g., teletext) scan lines. The decoded VBI scan lines are placed into a VBI stack 410 by VBI decoder driver 404. The stored VBI scan lines are then interpreted by VBI data stream interpreter 418, which provides the interpreted teletext data to application 410. The image scan lines are processed by device dependent video drivers 412, which may be Microsoft Video for Windows drivers that implement Microsoft DirectX video support, for example. The device dependent video drivers 412 provide the processed data to a device independent video service 414, which may be Microsoft Video for Windows, for example. The device independent video service 414 then generates the television images for application 416.

As noted above, the present invention increases the bandwidth capacity of the VBI signals while adhering to current teletext timing standards. This goal is accomplished, at least in part, by using data compression and multiple signal level modulation encoding. In-this description, "multiple" signal level modulation encoding means modulation using three or more possible signal levels, as opposed to simple binary. These procedures may introduce greater noise susceptibility. Consequently, two error correction encoding schemes are also employed, i.e., an "outer" encoding and an "inner" encoding, the combined use of which helps to compensate for any such effect.

Figure 5:
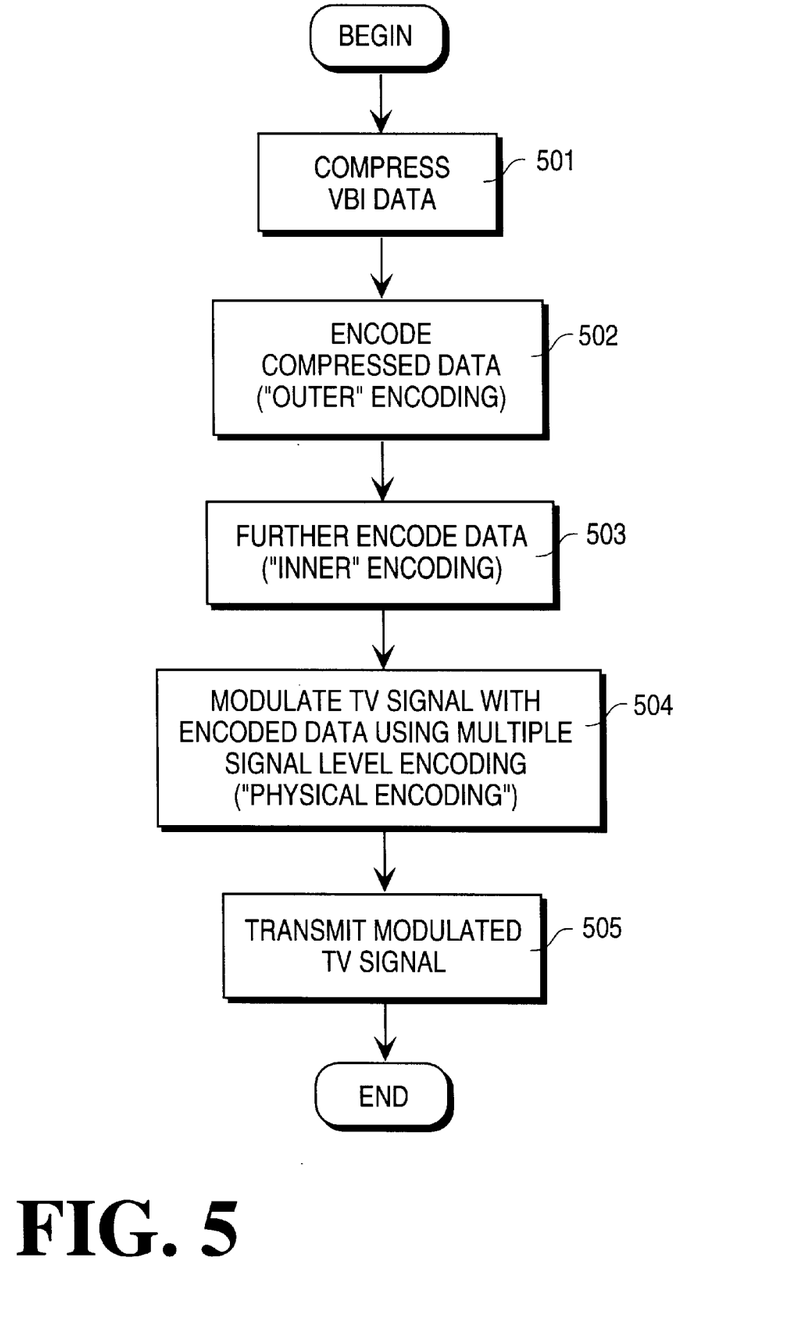
FIG. 5 is a flow diagram illustrating a routine for encoding and transmitting a television signal including teletext data.

FIG. 5 illustrates a routine for transmitting a television signal including VBI data according to the above-described technique. The VBI data is initially compressed at 501. At 502, the compressed data is encoded with an "outer" error correction encoding scheme. The outer encoding scheme is preferably a block level encoding (i.e., the encoding of multiple scan lines together), such as a Reed-Solomon encoding. At 503, the encoded data is further encoded using an "inner" error correction encoding scheme. The inner encoding scheme is preferably a symbol level encoding (i.e., encoding of a few bits at a time), which in one embodiment is partial response encoding. At 504, the television signal is modulated using multiple signal level encoding, as described above, while adhering to standard teletext timing. At 505, the modulated TV signal is then transmitted to one or more receiving stations.

Figure 6:
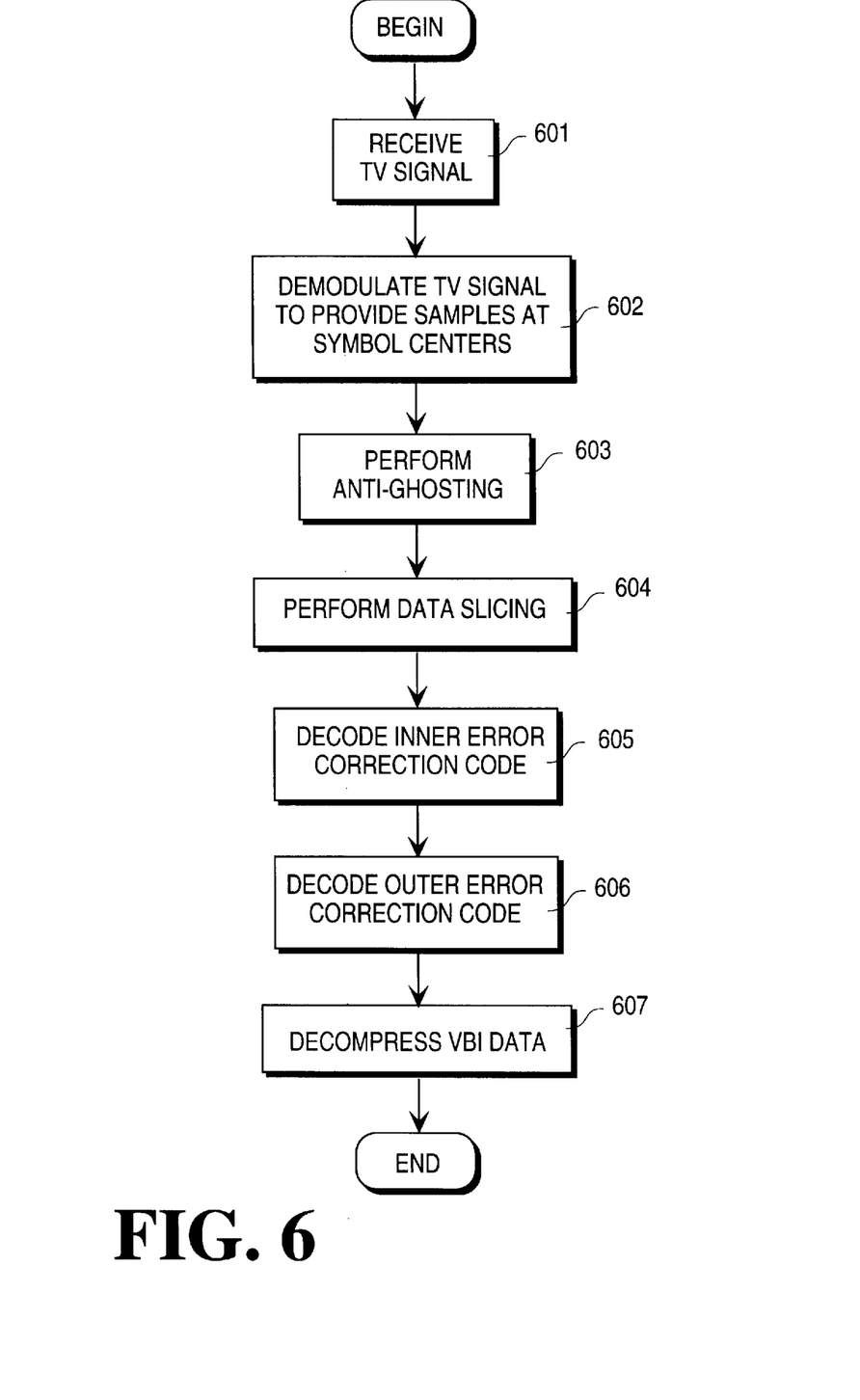
FIG. 6 is a flow diagram illustrating a routine for receiving and decoding a television signal including teletext data.

FIG. 6 illustrates a routine which may be performed in computer system 1, for demodulating and decoding data transmitted in accordance with the above routine. A TV signal is received at 601 and demodulated at 602 by the tuner/capture subsystem 20 to provide multi-bit (e.g., eight-bit) samples at the symbol centers of the VBI data. Af 603, the host performs anti-ghosting of the VBI data, and at 604, the host performs either hard or soft slicing of the data. The data slicing is based on the multiple signal level encoding discussed above, i.e., multiple thresholds are used to assign a given sample to one of three or more possible output values. In the case of hard data slicing, the data is simply assigned one of the possible output values, whereas in the case of soft data slicing, additional bits are generated to qualify the output value, such as to provide a confidence measure. Following data slicing, the host decodes the inner and outer error correction codes at 605 and 606, respectively, and at 607, the host decompresses the decoded VBI data.

Thus, a method and apparatus for performing host-based anti-ghosting of teletext data using non-oversampled data have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of processing vertical blanking interval (VBI) data, the method comprising:
   receiving a television signal containing VBI data having a VBI data symbol rate;
   extracting the VBI data from the television signal;
   providing the VBI data to a host processor in the form of non-oversampled data, sampled at a rate no higher than the VBI data symbol rate; and
   using the host processor to perform anti-ghosting of the VBI data based on the non-oversampled data.

2. A method according to claim 1, wherein the VBI data comprises teletext data.

3. A method according to claim 1, wherein providing the VBI data to a host processor in the form of non-oversampled data comprises providing the VBI data to the host processor in the form of data sampled at a teletext standard data rate.

4. A method according to claim 3, wherein the teletext standard data rate comprises a North American Basic Teletext Specification (NABTS) specified teletext data rate.

5. A method according to claim 1, further comprising using the host processor to slice the non-oversampled VBI data based on an at least three level modulation scheme.

6. A method according to claim 5, wherein the VBI data is encoded in the television signal using a plurality of nested error correction encoding schemes, the method further comprising:
   using the host processor to decode the VBI data based on a first error correction scheme to produce first decoded data; and
   using the host processor to decode the first decoded data based on a second error correction scheme to obtain the VBI data.

7. A method of performing anti-ghosting on teletext data in a computer system, the method comprising:
   receiving a television signal containing encoded teletext data having a data symbol rate at a video subsystem of the computer system;
   oversampling the television signal in the video subsystem to generate oversampled data representing the encoded teletext data;
   reconstructing bit peaks of the encoded teletext data based on the over-sampled data to produce non-oversampled data, sampled at a rate no higher than the data symbol rate, representing the encoded teletext data;
   providing the non-oversampled data from the video subsystem to a host processor of the computer system; and
   using the host processor to perform anti-ghosting of the encoded teletext data based on the non-oversampled data.

8. A method according to claim 7, further comprising using the host processor to data slice the television signal based on an at least three signal level modulation scheme.

9. A method according to claim 8, further comprising:
   decoding the teletext data based on a first error correction encoding scheme to produce first decoded data;
   decoding the first decoded data based on a second error correction decoding scheme to produce the teletext data.

10. A processing system comprising:
    a host processor;
    a host memory coupled to the host processor;
    a host interface coupled to the host memory; and
    a tuner/capture unit coupled to the host memory though the host interface, the tuner/capture unit receiving a television signal, the tuner/capture unit extracting vertical blanking interval (VBI) data having a VBI data symbol rate from the television signal, the tuner/capture unit providing the VBI data to the host memory via the host interface in the form of non-oversampled data, sampled at a rate no higher than the VBI data symbol rate, the host processor accessing the non-oversampled data in the host memory and using the non-oversampled data to perform anti-ghosting of the VBI data.

11. A processing system according to claim 10, wherein the VBI data comprises teletext data.

12. A processing system according to claim 11, wherein the non-oversampled data comprises data sampled at a North American Basic Teletext Specification (NABTS) specified teletext data rate.

13. A processing system according to claim 10, wherein the television signal has been modulated using an at least three signal level modulation prior to the tuner/capture unit receiving the television signal, and wherein the host processor further slices the television signal based on said at least three signal level modulation.

14. A processing system according to claim 13, wherein the VBI data is encoded in the television signal using a plurality of nested error correction encoding schemes, and wherein the host processor further decodes the VBI data based on a first error correction scheme to produce first decoded data, and wherein the host processor decodes the first decoded data based on a second error correction scheme to obtain the VBI data.

15. A computer system comprising:
    host control means for controlling operation of the computer system;
    storage means for storing data; and
    tuner/capture means for receiving a television signal and for extracting vertical blanking interval (VBI) data having a VBI data symbol rate from the television signal; and
    host interface means for coupling the tuner/decoder means to the storage means;
    wherein the tuner/capture means includes means for providing non-oversampled data, sampled at a rate no higher than the VBI data symbol rate, representing the VBI data to the storage means via the host interface means, the non-oversampled data corresponding to a North American Basic Teletext Specification (NABTS) teletext data; and
    wherein the host control means includes means for accessing the non-oversampled data in the storage means and means for using the non-oversampled data to perform anti-ghosting of the VBI data.

16. A computer system according to claim 15, wherein the VBI data has been modulated using an at least three signal level modulation scheme, and wherein the host control means further comprises means for slicing the VBI data based on the at least three signal level modulation scheme.

17. A computer system according to claim 16, wherein the VBI data is encoded in the television signal based on both a first error correction encoding scheme and a second error correction encoding scheme, and wherein the host control means further comprises means for decoding the VBI data based on the first and second error correction encoding schemes to obtain the VBI data.

18. A method of processing a television signal including encoded teletext data having a data symbol rate, the method comprising:
    receiving the television signal;
    demodulating the television signal;
    decoding data in the television signal based on a first error correction scheme to produce first decoded data; and
    decoding the first decoded data based on a second error correction scheme to produce the teletext data.

19. A method according to claim 18, further comprising:
    producing non-oversampled samples, sampled at a rate no higher than the teletext data symbol rate, representing the teletext data; and
    performing anti-ghosting of the teletext data based on the non-oversampled samples.

20. A method according to claim 19, wherein the television signal is modulated according to an at least three signal level modulation, the method further comprising slicing data in the television signal based on said at least three signal level modulation.

21. A method according to claim 18, wherein decoding data in the television signal based on a first error correction scheme comprises decoding the data based on a partial response coding scheme.

22. A method according to claim 21, wherein decoding the first decoded data based on a second error correction scheme comprises decoding the first decoded data based on a Reed-Solomon encoding scheme.

23. A method of transmitting a television signal including vertical blanking interval (VBI) data, the method comprising:

encoding the VBI data using a first error correction code to produce first encoded data;

encoding the first encoded data using a second error correction code to produce second encoded data;

modulating the television signal with the second encoded data; and transmitting the modulated television signal.

24. A method according to claim 23, wherein modulating the television signal comprises modulating the television signal using an at least three signal level modulation encoding.

* * * * *

UNITED STATES PATENT AND TRADEMARK OFFICE
CERTIFICATE OF CORRECTION

PATENT NO.     : 6,067,122
DATED          : May 23, 2000
INVENTOR(S)    : Cahill, III It is certified that error appears in the above-identified patent and that said Letters Patent is hereby corrected as shown below:

Column 5,
Line 21, delete "date" and insert -- data --.
Line 32, delete "ten" and insert -- then --.

Signed and Sealed this

Fourteenth Day of January, 2003

JAMES E. ROGAN
*Director of the United States Patent and Trademark Office*